(12) United States Patent
Lee

(10) Patent No.: US 7,342,522 B2
(45) Date of Patent: Mar. 11, 2008

(54) DIGITAL AUDIO PLAYER AND PLAYING METHOD THEREOF

(75) Inventor: In Ha Lee, Gunpo (KR)

(73) Assignees: Enter Tech Co., Ltd., Seoul (KR); Kyung Ho Lee, Seoul (KR)

( * ) Notice: Subject to any disclaimer, the term of this patent is extended or adjusted under 35 U.S.C. 154(b) by 0 days.

(21) Appl. No.: 11/437,063

(22) Filed: May 19, 2006

(65) Prior Publication Data
US 2006/0265092 A1   Nov. 23, 2006

(30) Foreign Application Priority Data
May 20, 2005   (KR) ...................... 10-2005-0042435

(51) Int. Cl.
*H03M 1/00* (2006.01)
(52) U.S. Cl. .................................... 341/110
(58) Field of Classification Search ................ 341/110, 341/144, 155; 84/603, 612
See application file for complete search history.

(56) References Cited

U.S. PATENT DOCUMENTS 6,621,982 B1 * 9/2003 Kimura et al. .............. 386/116
6,630,621 B1 * 10/2003 Yamada et al. ............... 84/603
2006/0233203 A1 * 10/2006 Iwamura ..................... 370/516

* cited by examiner

*Primary Examiner*—Brian Young
(74) *Attorney, Agent, or Firm*—Ladas & Parry LLP

(57) ABSTRACT

The present invention is directed to an apparatus and method for digital-mixing two sound sources, and performing both audio-outputting and encoding-storing of the digital-mixed sound sources. The digital audio player of the present invention includes: an analog-to-digital converter for converting an analog audio signal input through an audio signal input unit to a digital audio signal; a memory for storing a compressed digital audio signal; a mixer for digital-mixing the digital audio signal output from the analog-to-digital converter with a decoded digital music signal from the memory; a digital-to-analog signal converter for converting the digital signal output from the mixer to an analog signal and sending the analog signal to an audio output unit; and a central processing unit for generating a control signal for reading out compressed music data from the memory, decoding the music data, sending the decoded music data to the mixer, encoding the mixed digital signal from the mixer, and then storing the encoded digital signal in the memory. The digital audio playing method uses the digital audio player to perform both encoding and decoding, thereby mixing digital audio signals and realizing both audio-outputting and memory-storing of the digital-mixed audio signals.

19 Claims, 5 Drawing Sheets

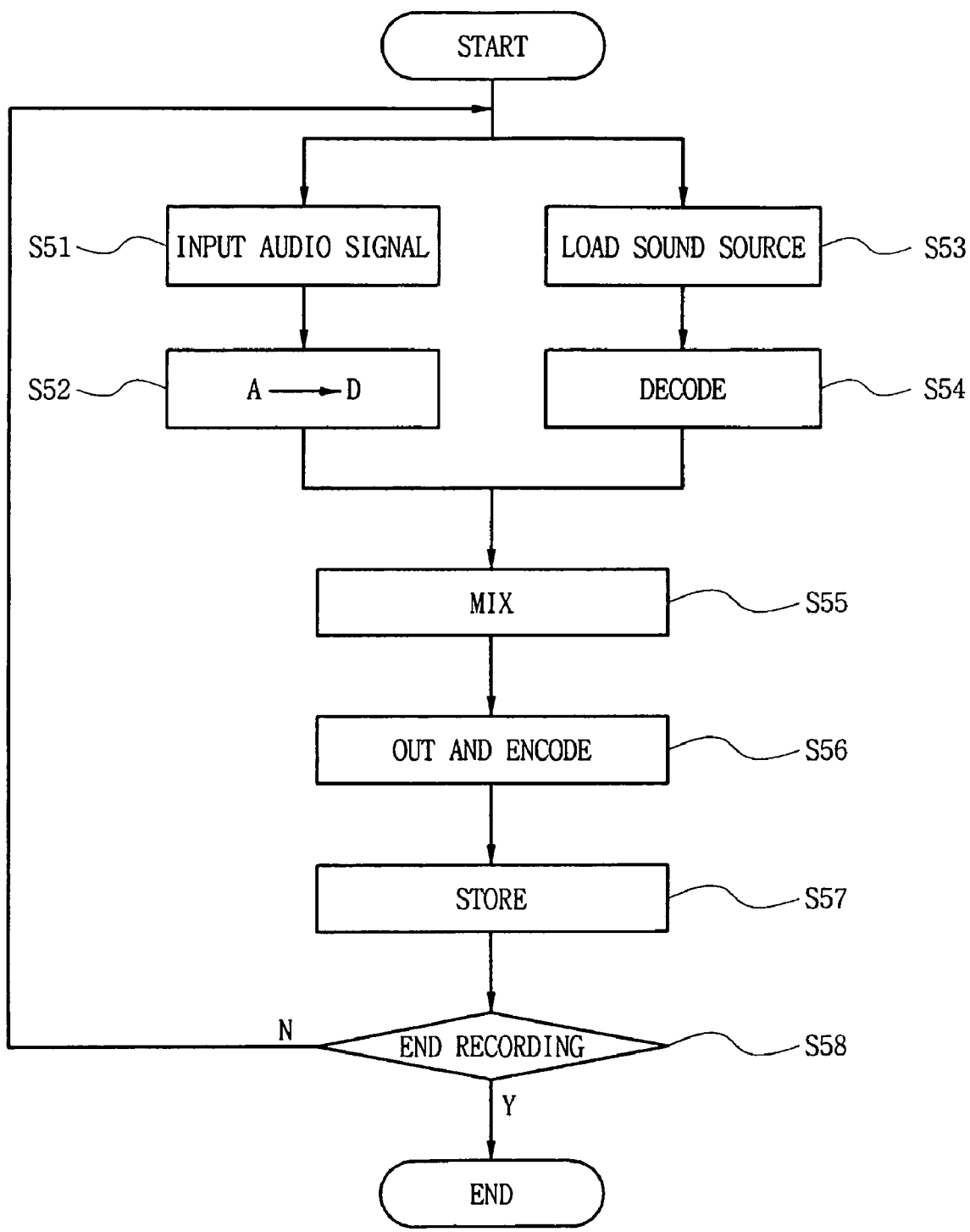

DIGITAL AUDIO PLAYER AND PLAYING METHOD THEREOF

PRIORITY

This application claims priority to an application entitled "DIGITAL AUDIO PLAYER AND PLAYING METHOD THEREOF" that was filed in the Korean Intellectual Property Office on May 20, 2005, and assigned Korean Application No. 2005-0042435, the contents of which are incorporated herein by reference.

BACKGROUND OF THE INVENTION

1. Field of the Invention

The present invention relates to an apparatus for reproducing digital audio signals. More specifically, the present invention relates to an apparatus and a method for digital-mixing two sound sources, and performing both audio-outputting and encoding-storing of the digital-mixed sound sources.

2. Description of the Related Art

FIG. 1 is a schematic block diagram of a digital audio player according to prior art. Referring to FIG. 1, the digital audio player includes a central processing unit (CPU) 120, a codec unit 110, a memory unit 130, and an audio output input 140. The playing and recording processes using the conventional digital audio player shown in FIG. 1 are illustrated in FIGS. 2 and 3.

In the playing process, the CPU 120 reads out the digital sound source from the memory unit 130 by the user's manipulation, in step S11, and performs decoding, in step S12. The sound sources stored in the memory unit 130 are digital audio signals compressed in different forms.

The digital signals decoded by the CPU 120 are converted to analog signals at the codec unit 110 and output through the audio output unit 140 such as a speaker or the like, in step S13.

In the recording process, the codec unit 110 transfers audio signals externally input through an audio input unit such as a microphone, in step S21.

The CPU 120 encodes the digital signal data from the codec unit 110 according to a defined method, in step S22, and stores them in the memory unit 130.

In the above description, the codec unit performs analog-to-digital or digital-to-analog signal conversions. Namely, it converts analog audio signals externally input through a microphone into digital signals, or digital signals from the CPU into analog signals in the form of audible sound to be output through the output unit such as a speaker.

As described above, the conventional digital audio player performs a digital audio playing operation and a recording operation separately in a different procedure.

The reason for this is that the CPU 120 has no function of processing the two events in a simultaneous manner. Accordingly, there is a demand for a digital audio player or a playing method thereof for performing both playing and recording operations with one digital audio player.

It is therefore an object of the present invention to provide a digital audio player and a playing method thereof for digital-mixing two sound sources and performing both audio outputting and recording.

It is another object of the present invention to provide a digital audio player and a playing method thereof for performing both decoding and encoding of digital audio sources.

SUMMARY OF THE INVENTION

To achieve the objects of the present invention, there is provided a digital audio player that includes: an analog-to-digital converter for converting an analog audio signal input through an audio signal input unit to a digital audio signal; a memory for storing a compressed digital audio signal; a mixer for digital-mixing the digital audio signal output from the analog-to-digital converter with a decoded digital music signal from the memory; a digital-to-analog signal converter for converting the digital signal output from the mixer to an analog signal and sending the analog signal to an audio output unit; and a central processing unit (CPU) for generating a control signal for reading out compressed music data from the memory, decoding the music data, sending the decoded music data to the mixer, encoding the mixed digital signal from the mixer, and then storing the encoded digital signal in the memory.

More specifically, the memory stores at least one compressed audio signal selected from MP3, WMA, OGG, or ASF.

The CPU uses an interface unit such as a USB or the like to communicate signals with a personal computer (PC).

The digital audio player is portable.

There is also provided a digital audio playing method for performing both encoding and decoding, mixing digital audio signals, and storing the mixed digital audio signals in a memory.

More specifically, the digital audio playing method includes: externally receiving an analog audio signal and converting it to a digital audio signal by analog-to-digital conversion; reading out compressed sound source data from a memory and restoring the compressed data by decoding; digital-mixing the analog-to-digital converted signal with the restored data of the decoding step; and encoding the digital-mixed data to output an audio signal and store it in a memory.

The digital audio playing method further includes: sending the digital-mixed data to an external unit.

BRIEF DESCRIPTION OF THE DRAWINGS

The above and other objects, features and advantages of the present invention will become more apparent from the following detailed description when taken in conjunction with the accompanying drawings in which:

FIG. 5 is a flow chart showing the process of a digital audio playing method according to the present invention.

DETAILED DESCRIPTION OF THE PREFERRED EMBODIMENTS

Figure 1:
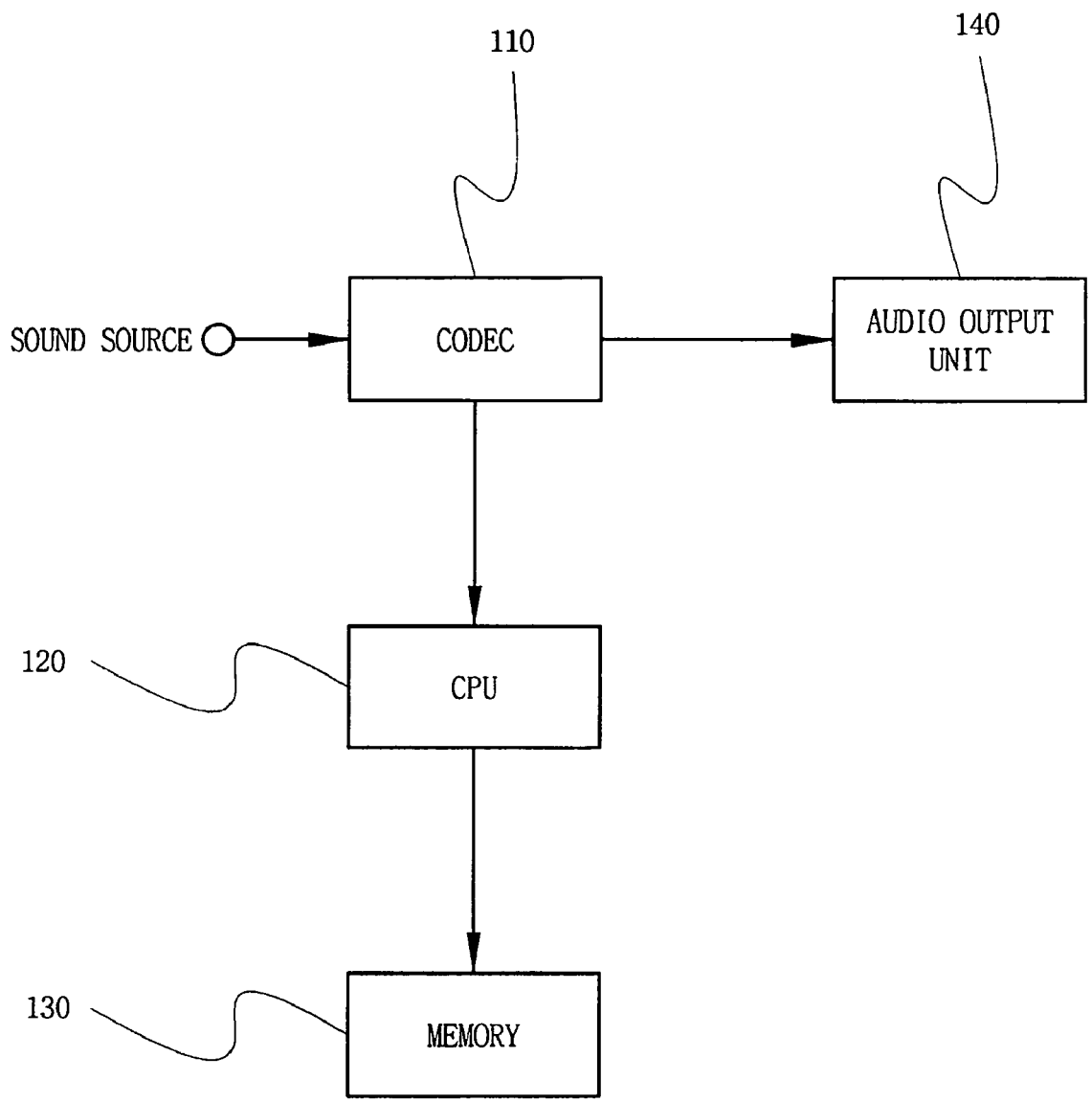
FIG. 1 is a schematic block diagram of a digital audio player according to prior art.
Figure 2:
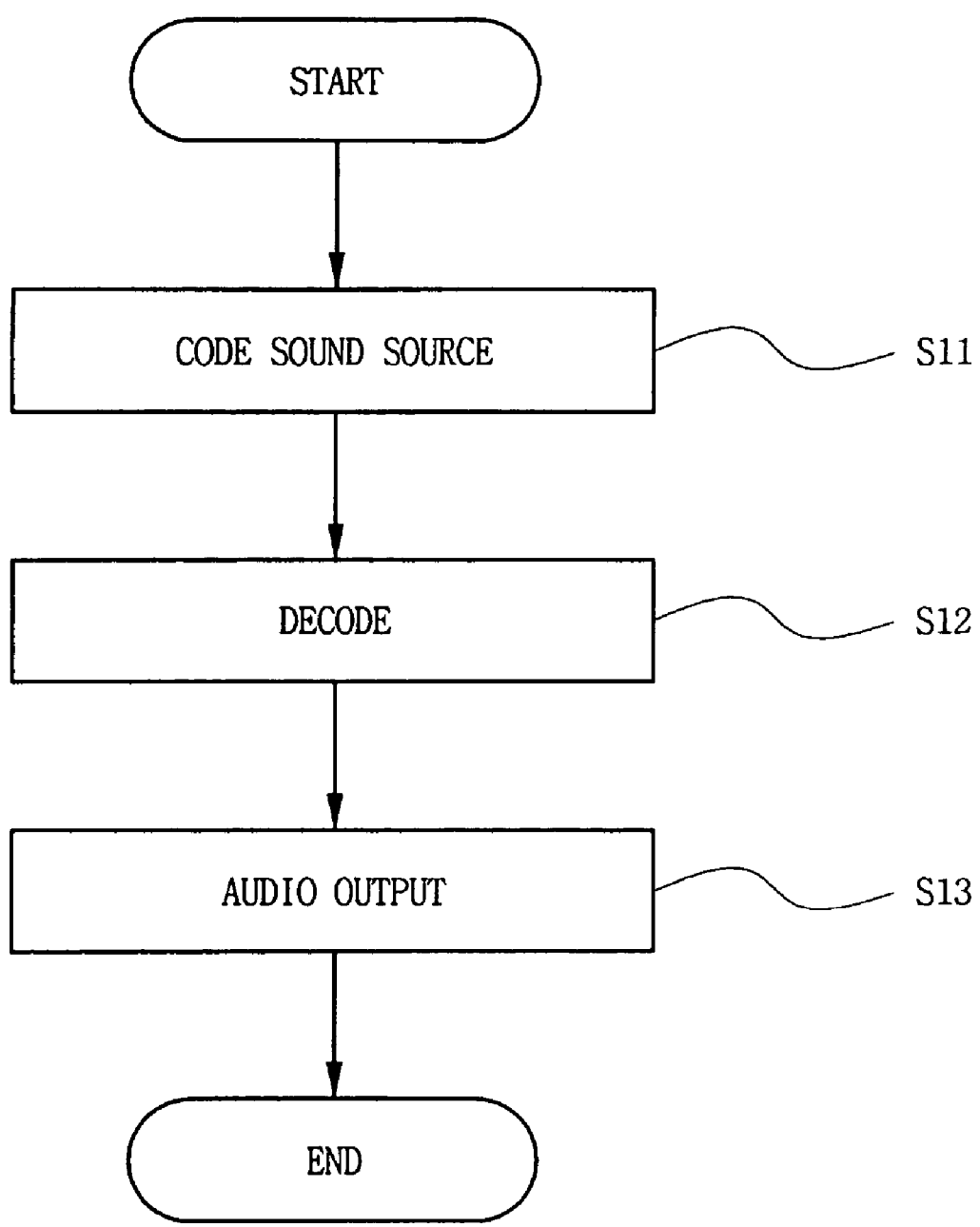
FIG. 2 is a flow chart showing an audio outputting process according to prior art.
Figure 3:
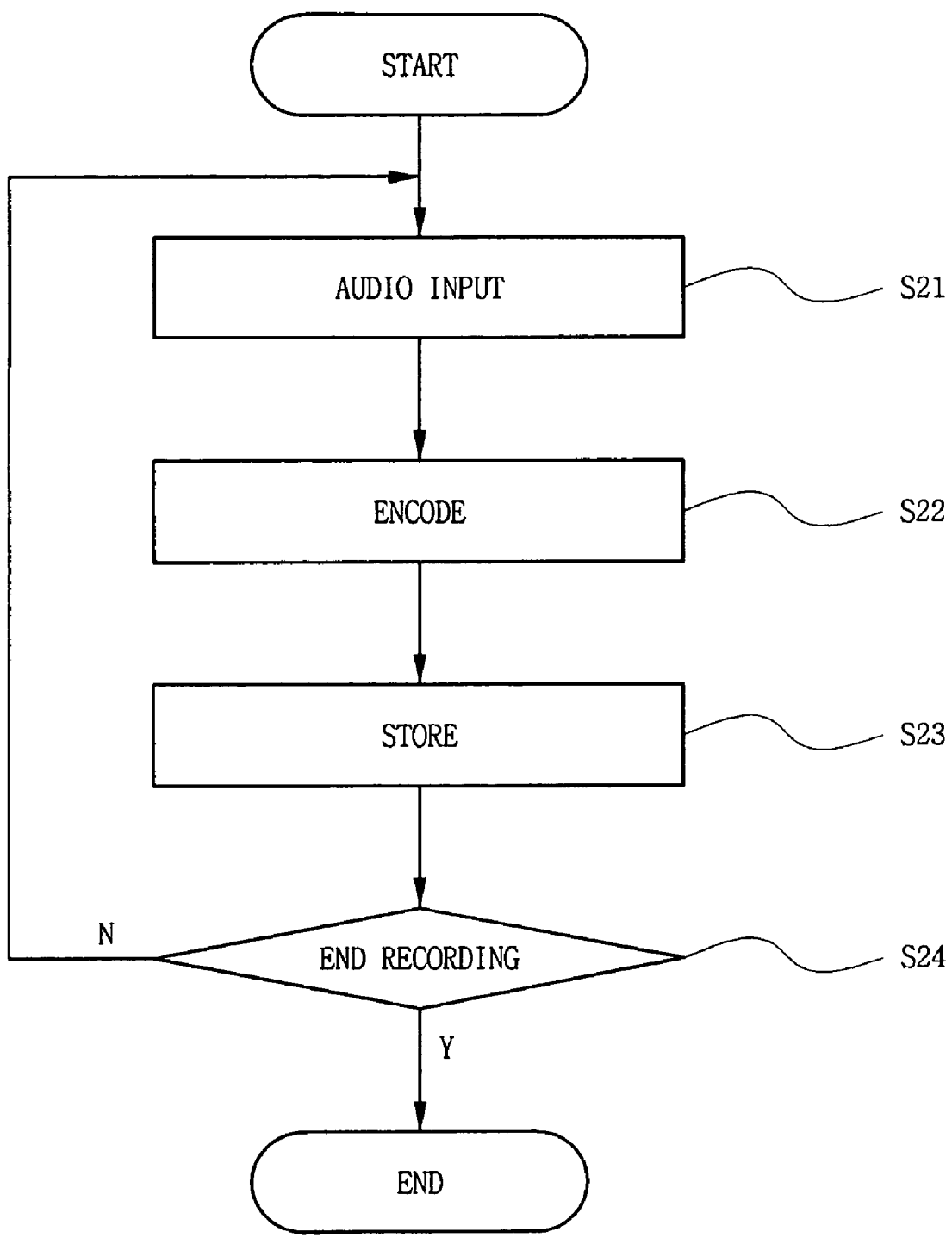
FIG. 3 is a flow chart showing an audio recording process according to prior art.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail. The following description of the present invention is provided by way of the following examples, which are not intended to limit the scope of the present invention.

Figure 4:
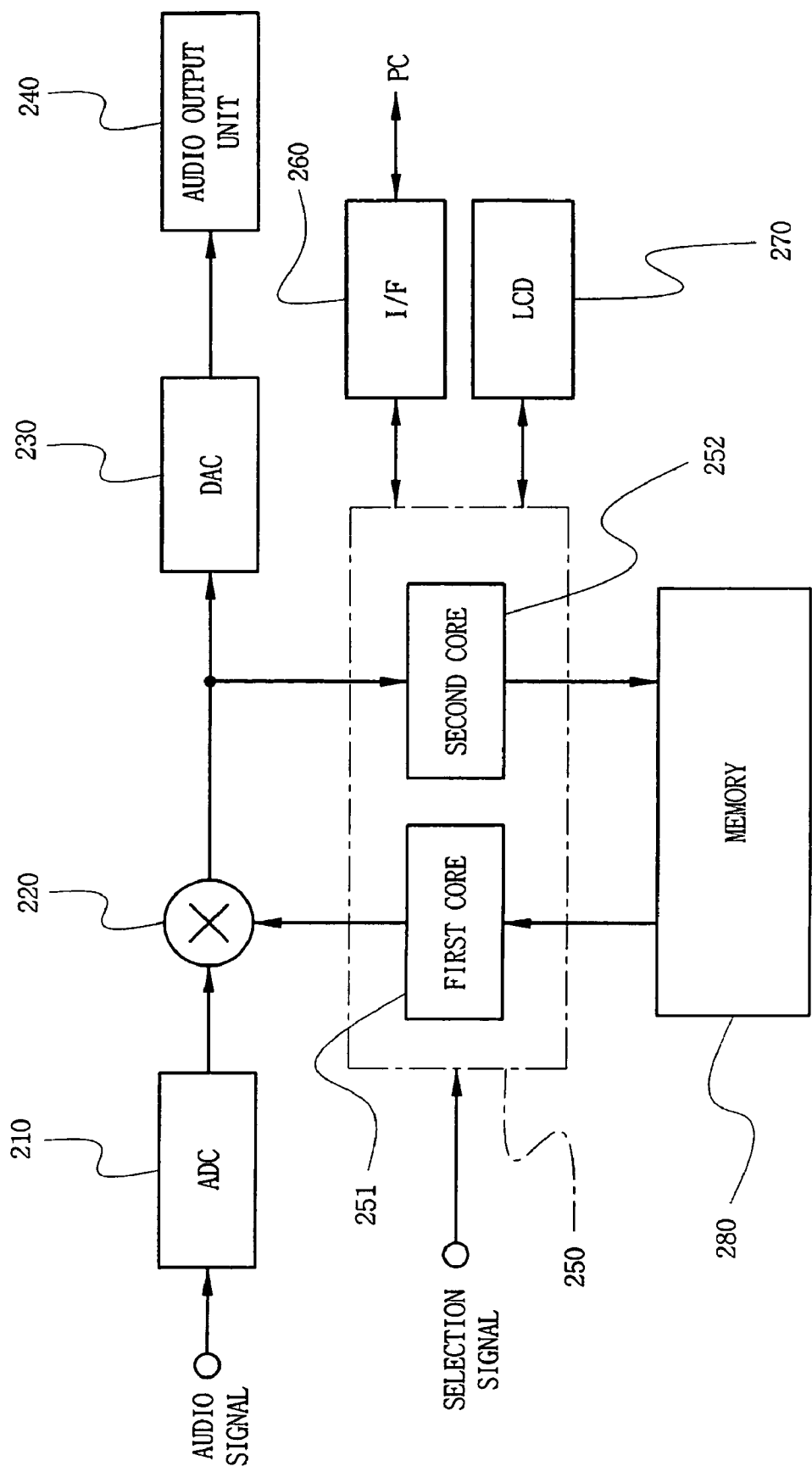
FIG. 4 is a block diagram of a digital audio player according to the present invention.

The digital audio player of the present invention includes, as illustrated in FIG. 4: an analog-to-digital converter (ADC) 210 for converting an analog audio signal input through an audio signal input unit to a digital audio signal; a memory 280 for storing a compressed digital audio signal; a mixer 220 for digital-mixing the digital audio signal output from the analog-to-digital converter 210 with a decoded digital music signal from the memory 280; a digital-to-analog signal converter (DAT) 230 for converting the digital signal output from the mixer 220 to an analog signal and sending the analog signal to an audio output unit 240; and a central processing unit (CPU) 250 for generating a control signal for reading out compressed music data from the memory, decoding the music data, sending the decoded music data to the mixer 220, encoding the mixed digital signal from the mixer, and then storing the encoded digital signal in the memory 280.

By introducing a function of mixing digital data, the digital audio player can encode the mixed digital data and store the final digital-mixed compressed sound sources (i.e., digital compressed sound source data such as MP3, WMA, OGG, ASF, etc.) in the memory.

The CPU communicates data with an external unit such as a personal computer (PC) via an interface unit 260 such as a USB, or the like.

The digital audio player further includes an LCD, which is a display unit for displaying an operational status of the player to be recognizable to a user.

The digital audio mixing can be realized when the CPU is capable of both encoding and decoding.

As stated above, the present invention is characterized in that one CPU performs both decoding and encoding functions. By way of an embodiment of the present invention, the CPU is a dual-core processor, which is adopted on demand because it may cause a rise of the cost.

The CPU 250 includes: a first core 251 for decoding a compressed digital signal read out from the memory 280; and a second core 252 for encoding digital-mixed data.

The term "dual-core processor" as used herein implies that one CPU includes two cores, which are the so-called brains of the CPU. Namely, the digital audio player of the present invention is a high-quality device that employs only one CPU but has the effect of two CPUs.

The theoretical data processing rate doubles when the digital audio player has two CPUs instead of using a single CPU. The core of the CPU, which is the central and most important part of the CPU, specifically refers to the original CPU part other than built-in co-processors and a built-in L2 cache in the Pentium CPU. Namely, the CPU core includes an operational unit, registers, and a control unit.

In the CPU of the same type, the performance of the PC system is proportional to the size of the CPU clock or the cache memory.

In another aspect of the digital audio playing method of the present invention, the digital mixing process is performed by a dual-core CPU that includes a first core for encoding digital-mixed data, and a second core for decoding the compressed digital signal read out from the memory.

FIG. 5 is a flow chart showing the procedures of the digital audio playing method of the present invention, which includes: (a) externally receiving an analog audio signal and converting it to a digital audio signal by analog-to-digital conversion, in steps S51 and S52; (b) reading out compressed sound source data from a memory and restoring the compressed data by decoding, in steps S53 and S54; (c) digital-mixing the analog-to-digital converted signal with the restored data of the decoding step, in step S55; and (d) encoding the digital-mixed data to output an audio signal and store it in a memory, in steps S56 and S57.

First, the user selects a desired digital sound source from the memory unit with an input unit, such as touch panel 270, touch wheel, or the like. The first core 251 decodes the selected digital sound source. The digital signal stored in the memory, which is the compressed sound source, has not to be restored by decoding. The analog-to-digital converter 210 converts the analog signal input through an audio signal input unit such as a microphone or the like to a digital signal and send the converted digital signal to the mixer 220. The input audio signal source comes in different forms. Namely, the audio signal may be input through a direct audio input unit using a microphone, or a defined selector of radio or external audio signals.

The external audio data are subjected to analog-to-digital conversion (ADC) via a codec, and the compressed sound source data stored in the memory are read out and restored by decoding.

The digital mixing is then carried out on the two sound source data, which are the data from the ADC step and the restored data from the compressed data read out from the memory. The mixed data are audio-output via the codec (DAC function), sent to the second core 252 of the CPU for encoding, and stored in the memory.

The present invention may adopt various functions such as digital karaoke player (that enables a user to sing a song to the accompaniment and store it in the memory in the form of compressed data), a music letter, a language learning, and so forth. Improving the problem with the conventional portable music player (e.g., portable MP3 player, digital music player, etc.) that encodes only one sound source and stores it in the memory and departing from the monotonous encoding of a single sound source (e.g., digital compressed sound source data such as MP3, WMA, OGG, ASF, etc.), the present invention performs encoding and real-time memory-storing as well as digital mixing of two sound sources and possibly implements different optional functions such as digital record karaoke, music letter, digital audio mixer, and so forth.

While this invention has been described in connection with the embodiments, it is to be understood to those skilled in the art that the invention is not limited to the disclosed embodiments, but, on the contrary, is intended to cover various modifications and equivalent arrangements. Particularly, the number of layers is flexible and the core/shell structure can have a gradient. Accordingly, the technical coverage of the present invention is to be included within the spirit and scope of the appended claims.

As described above, the digital audio player and the digital audio playing method according to the present invention can realize both encoding and decoding with one digital audio player.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A digital audio player comprising:
   an analog-to-digital converter for converting an analog audio signal input through an audio signal input unit to a digital audio signal;
   a memory for storing a compressed digital audio signal;
   a mixer for digital-mixing the digital audio signal output from the analog-to-digital converter with a decoded digital music signal from the memory;
   a digital-to-analog signal converter for converting the digital signal output from the mixer to an analog signal and sending the analog signal to an audio output unit; and
   a central processing unit for generating a control signal for reading out compressed music data from the memory, decoding the music data, sending the decoded music data to the mixer, encoding the mixed digital signal from the mixer, and then storing the encoded digital signal in the memory.

2. The digital audio player as claimed in claim 1, wherein the CPU has both decoding and encoding functions in one core for digital mixing.

3. The digital audio player as claimed in claim 1, wherein the CPU includes a dual-core processor.

4. The digital audio player as claimed in claim 3, wherein the CPU comprises:
   a first core for decoding a compressed digital signal read out from the memory; and
   a second core for encoding digital-mixed data.

5. The digital audio player as claimed in claim 1, wherein the audio signal input unit includes a microphone.

6. The digital audio player as claimed in claim 1, wherein the memory stores at least one compressed audio signal selected from MP3, WMA, OGG, or ASF.

7. The digital audio player as claimed in claim 1, further comprising:
   an interface unit for communicating signals between the CPU and an external unit.

8. The digital audio player as claimed in claim 7, wherein the interface unit includes a USB.

9. The digital audio player as claimed in claim 8, wherein the USB is used to communicate data with a personal computer (PC).

10. The digital audio player as claimed in claim 1, further comprising:
    a display unit for displaying en operational status of the player to be recognizable to a user according to the control signal of the CPU.

11. The digital audio player as claimed in claim 10, wherein the display unit includes a liquid crystal display (LCD).

12. The digital audio player as claimed in claim 11, wherein the LCD includes a touch panel.

13. The digital audio player as claimed in claim 1, wherein the digital audio player is portable.

14. A digital audio playing method comprising:
    externally receiving an analog audio signal and converting it to a digital audio signal by analog-to-digital conversion;
    reading out compressed sound source data from a memory and restoring the compressed data by decoding;
    digital-mixing the analog-to-digital converted signal with the restored data of the decoding step; and
    encoding the digital-mixed data to output an audio signal and store it in a memory, wherein both the encoding and decoding steps are performed in a same central processing unit.

15. The digital audio playing method as claimed in claim 14, wherein the digital mixing step is performed in one CPU capable of both decoding and encoding.

16. The digital audio playing method as claimed in claim 14, wherein the digital mixing step is performed by a dual-core CPU.

17. The digital audio playing method as claimed in claim 16, wherein the CPU comprises:
    a first core for encoding the digital-mixed data; and
    a second core for decoding a compressed digital signal read out from the memory.

18. The digital audio playing method as claimed in claim 14, wherein the memory stores at least one compressed audio signal selected from MP3, WMA, OGG or ASF.

19. The digital audio playing method as claimed in claim 14, further comprising: sending the digital-mixed data to an external unit.

* * * * *